United States Patent
Brocheton

(10) Patent No.: US 9,938,182 B2
(45) Date of Patent: Apr. 10, 2018

(54) ULTRAVIOLET ABSORBING GLASS AND ARTICLES THEREOF

(71) Applicant: Corning Incorporated, Corning, NY (US)

(72) Inventor: Yves Andre Henri Brocheton, Samoreau (FR)

(73) Assignee: Corning Incorporated, Corning, NY (US)

(*) Notice: Subject to any disclaimer, the term of this patent is extended or adjusted under 35 U.S.C. 154(b) by 237 days.

(21) Appl. No.: 15/043,711

(22) Filed: Feb. 15, 2016

(65) Prior Publication Data

US 2016/0257604 A1 Sep. 8, 2016

Related U.S. Application Data

(60) Provisional application No. 62/126,796, filed on Mar. 2, 2015.

(51) Int. Cl.
| | |
|---|---|
| *C03C 3/11* | (2006.01) |
| *G02C 7/10* | (2006.01) |
| *C03C 4/08* | (2006.01) |
| *C03C 14/00* | (2006.01) |

(52) U.S. Cl.
CPC ............. *C03C 4/085* (2013.01); *C03C 3/11* (2013.01); *C03C 14/006* (2013.01); *G02C 7/10* (2013.01); *C03C 2214/08* (2013.01)

(58) Field of Classification Search
None
See application file for complete search history.

(56) References Cited

U.S. PATENT DOCUMENTS

| | | | | |
|---|---|---|---|---|
| 4,608,349 A | * | 8/1986 | Kerko | C03C 4/06 501/13 |
| 5,242,869 A | * | 9/1993 | Tarumi | C03C 1/10 501/56 |
| 5,281,562 A | * | 1/1994 | Araujo | C03C 3/091 501/32 |
| 5,430,573 A | * | 7/1995 | Araujo | C03B 23/0256 359/361 |
| 6,420,290 B1 | * | 7/2002 | Brocheton | C03C 3/064 501/56 |
| 7,019,189 B1 | * | 3/2006 | Chekhmir | B09B 3/005 501/59 |
| 2005/0054512 A1 | * | 3/2005 | Brocheton | C03C 3/064 501/56 |
| 2006/0142413 A1 | * | 6/2006 | Zimmer | C03C 3/089 523/122 |
| 2006/0189471 A1 | * | 8/2006 | Chekhmir | C03C 1/002 501/65 |
| 2006/0236720 A1 | * | 10/2006 | Ichimura | C03B 23/037 65/30.1 |
| 2007/0022781 A1 | * | 2/2007 | Aoki | C03B 23/037 65/33.3 |
| 2007/0022782 A1 | * | 2/2007 | Aoki | C03B 23/037 65/33.3 |
| 2007/0122356 A1 | * | 5/2007 | Kessler | A61K 6/0017 424/49 |
| 2010/0073765 A1 | * | 3/2010 | Brocheton | C03C 3/068 359/361 |
| 2010/0167904 A1 | * | 7/2010 | Ichimura | C03B 23/037 501/32 |
| 2011/0235176 A1 | * | 9/2011 | Ikeda | C03B 23/047 359/487.06 |
| 2014/0151613 A1 | * | 6/2014 | Brocheton | C03C 3/093 252/586 |

FOREIGN PATENT DOCUMENTS

| | | | | |
|---|---|---|---|---|
| EP | 228159 A1 | 7/1987 | | |
| EP | 228159 B1 | 1/1992 | | |
| EP | 0586948 A1 | * 3/1994 | ............... | C03C 3/11 |
| EP | 0586948 A1 | 3/1994 | | |

OTHER PUBLICATIONS

International Search Search Report and Written Opinion PCT/US2016/020161 dated Jun. 15, 2016.

* cited by examiner

*Primary Examiner* — Peter A Salamon
(74) *Attorney, Agent, or Firm* — Kevin L. Bray

(57) ABSTRACT

Disclosed herein are ultraviolet absorbing glasses. The glasses can be strengthened by a chemical tempering process and maintain good mechanical and optical properties while having a reduced thickness compared to conventional glasses. The ultraviolet absorbing glasses can include coloring agents and can be formed into ophthalmic lenses. Methods of making and using the ultraviolet absorbing glasses are also described.

17 Claims, No Drawings

ULTRAVIOLET ABSORBING GLASS AND ARTICLES THEREOF

This application claims the benefit of priority under 35 U.S.C. § 119 of U.S. Provisional Application Ser. No. 62/126,796 filed on Mar. 2, 2015 the content of which is relied upon and incorporated herein by reference in its entirety.

BACKGROUND

Numerous UV-protective glass (oxides) and plastic lens compositions have been previously described. Often, a trade-off exists between strength or mechanical properties and UV absorbance. For example, plastic lenses are lightweight due to their low densities; they can also be formed thinner than most glasses to further reduce weight. They also generally absorb UV radiation better than their glass counterparts. However, glass lenses, while typically heavier and thicker, are more scratch resistant and have better mechanical strength. Both glass and plastic lenses may be tinted a variety of colors, with the most common being green, gray, and brown.

One strategy for improving UV absorbance of glass lenses involves adding a cuprous or cuprous-cadmium halide crystal phase to non-photochromic colorless borosilicate glass. UV absorbance is improved in these glasses; however, the relative proportions of the oxide components in such compositions must be adjusted to maintain basicity. Thus, the use of alkali metals and alkaline earth metals is limited, which can adversely affect mechanical and optical properties.

An alternative strategy for improving UV absorbance of glass lenses involves the addition of silver salts to the glass composition, including a final hydrogen firing step to product a tint. However, the thickness of such glasses must be kept above about 1.8 mm when fabricated as lenses to insure adequate mechanical strength.

Thinner glass lenses with good mechanical properties have also been prepared, but are not designed to absorb UV radiation. Instead, they are designed to be used as laminates, with at least some of the scratch resistance and mechanical strength imparted by the additional laminated layers.

Consequently, there is a need for a thin glass material with the UV absorption capabilities of plastic and the high mechanical strength of glass. Ideally, small amounts of coloring agents could be used to produce a tint in these glasses without affecting optical or mechanical properties. The present application addresses this need.

SUMMARY

Disclosed herein are ultraviolet absorbing glasses. The glasses can be strengthened by a chemical tempering process and maintain good mechanical and optical properties while having a reduced thickness compared to conventional glasses. The ultraviolet absorbing glasses can include coloring agents and can be formed into ophthalmic lenses. Methods of making and using the ultraviolet absorbing glasses are also described.

The advantages of the invention will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

The compositions, methods, and articles described herein can be understood more readily by reference to the following detailed description. It is also to be understood that the terminology used herein is for the purpose of describing particular aspects only and is not intended to be limiting.

It must be noted that, as used in the specification and appended claims, the singular forms "a," "an," and "the" include plural referents unless the context clearly dictates otherwise. Thus, for example, reference to "an alkali metal oxide" includes mixtures of two or more alkali metal oxides.

Throughout the description and claims of this specification, the word "comprise" and other forms of the word, such as "comprising" and "comprises," mean including but not limited to, and are not intended to exclude, for example, other additives, components, integers, or steps.

"Optional" or "optionally" means that the subsequently described event or circumstance can or cannot occur, and that the description includes instances where the event or circumstance occurs and instances where it does not. For example, the phrase "optionally includes a coloring agent" means that a coloring agent can or cannot be included.

As used herein, the term "about" provides flexibility to a numerical range endpoint by providing that a given value may be "a little above" or "a little below" the endpoint without affecting the desired result. Ranges may be expressed herein from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

"Admixing" or "admixture" refers to a combination of two or more components together wherein there is no chemical reaction or physical interaction. The terms "admixing" and "admixture" can also include the chemical reaction or physical interaction between any of the components described herein upon mixing to produce the composition. The components can be admixed alone, in water, in another solvent, or in a combination of solvents. The order in which the various components of the present glasses can be admixed with one another can vary.

"Scratch resistance" refers to the ability of the surface and interior of a lens or other glass article to remain smooth (i.e., avoid scratches or surface damage) when a hard object is dragged across the surface of the lens or glass article. In one aspect, the glass compositions disclosed herein are scratch resistant.

"Ultraviolet" or "UV" radiation is electromagnetic radiation with high frequency and low wavelength. In one aspect, UV radiation has a wavelength of between about 10 nm and about 400 nm. "UV absorbance," meanwhile, refers to an article or compound's ability to block transmission of (i.e., to "absorb") UV radiation. In some aspects, salts and elements and compounds such as CuO, Cl, Br, SnO, $Sb_2O_3$, and others exhibit UV absorbance. In a further aspect, salts, elements or compounds such as these are added to the present ultraviolet absorbing glass compositions to provide the glasses and articles made from the glasses with UV absorbance properties. In a still further aspect, it is desirable to produce glass compositions and articles with UV absorbance to protect, for example, the eyes from UV radiation.

"AS 1067:2003" is a standard for sunglasses and fashion spectacles created by Standards Australia/Standards New Zealand Committee CS-053 for the purpose of categorizing non-prescription lenses based on glare reduction and UV protection. A category 2 glass according to this standard would provide a medium level of glare reduction and good UV protection. A category 3 glass according to this standard would still provide good UV protection, as with category 2, but would have higher glare reduction.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc., of these materials are disclosed, that while specific reference of each various individual and collective combination and permutation of these compounds may not be explicitly disclosed, each is specifically contemplated and described herein. For example, if an alkali metal oxide is disclosed and discussed and a number of different transition metal oxides are discussed, each and every combination and permutation of alkali metal oxide and transition metal oxide that is possible is specifically contemplated unless specifically indicated to the contrary. For example, if a class of molecules A, B, and C are disclosed, as well as a class of molecules D, E, and F, and an example of a combination molecule A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from the disclosure of A, B, and C; D, E, and F; and the example combination A-D. Likewise, any subset or combination of these is also specifically contemplated and disclosed. Thus, for example, the sub-group of A-E, B-F, and C-E is specifically contemplated and should be considered from the disclosure of A, B, and C; D, E, and F; and the example combination A-D. This concept applies to all aspects of the disclosure including, but not limited to, steps in methods of making and using the disclosed compositions. Thus, if a variety of additional steps can be performed, it is understood that each of these additional steps can be performed with any specific embodiment or combination of embodiments of the disclosed methods, and that each such combination is specifically contemplated and should be considered disclosed.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

In one aspect, an ultraviolet absorbing glass is provided. The ultraviolet absorbing glass includes (a) a base glass composition with at least the following components by the given weight percentages:

| | |
|---|---|
| $SiO_2$ | 50-60 |
| $B_2O_3$ | 17.5-22.0 |
| $Al_2O_3$ | 6.5-8.0 |
| $Li_2O$ | 3.5-5.5 |
| $Na_2O$ | 0.5-7.5 |

-continued

| | |
|---|---|
| $K_2O$ | 0.5-7.5 |
| $ZrO_2$ | 2.0-7.0 |
| $TiO_2$ | 0-2.0 | and further includes (b) an ultraviolet component comprising (i) copper oxide and (ii) a chloride source, a bromide source, or a combination thereof. In some aspects, the amount of copper oxide can be from 0.25 to 1.5 parts by weight per 100 parts by weight base composition, or can be 0.25, 0.5, 0.75, 1.0, 1.25, or 1.5 parts by weight per 100 parts by weight base composition, where any value of the copper oxide can provide a lower and upper endpoint of a range. In a further aspect, the sum of the chloride from the chloride source, the bromide from the bromide source, or a combination thereof can be from 0.2 to 4.0 parts by weight per 100 parts by weight base composition. In a still further aspect, the chloride source can be NaCl, KCl, or another bromide salt and the bromide source can be NaBr, KBr, or another bromide salt.

In one aspect, the amount of copper oxide is from 0.5 to 1.0 parts by weight per 100 parts by weight base composition, or is 0.5, 0.6, 0.7, 0.8, 0.9, or 1.0 parts by weight per 100 parts by weight base composition, where any value of the copper oxide can provide a lower and upper endpoint of a range. In another aspect, the bromide from the bromide source is from 2.0 to 4.0 parts by weight per 100 parts by weight base composition, or is 2.0, 2.33, 2.5, 3.0, 3.5, or 4.0 parts by weight per 100 parts by weight base composition, where any value of the bromide source can provide a lower and upper endpoint of a range.

In a further aspect, the ultraviolet absorbing glass includes a base glass composition with at least the following components by the given weight percentages:

| | |
|---|---|
| $SiO_2$ | 54.0-58.0 |
| $B_2O_3$ | 19.0-21.0 |
| $Al_2O_3$ | 7.0-8.0 |
| $Li_2O$ | 4.0-5.0 |
| $Na_2O$ | 0.5-1.0 |
| $K_2O$ | 6.0-7.0 |
| $ZrO_2$ | 4.0-5.0 |
| $TiO_2$ | 0.5-1.5 |

In still another aspect, the ultraviolet absorbing glass includes a base glass composition with at least the following components by the given weight percentages:

| | |
|---|---|
| $SiO_2$ | 55.0-57.0 |
| $B_2O_3$ | 20.0-21.0 |
| $Al_2O_3$ | 7.0-8.0 |
| $Li_2O$ | 4.0-5.0 |
| $Na_2O$ | 4.0-5.0 |
| $K_2O$ | 0.5-1.5 |
| $ZrO_2$ | 4.0-5.0 |
| $TiO_2$ | 0.5-1.5 |

In one aspect, the ultraviolet absorbing glasses disclosed herein have transmission values (expressed as % per mm thickness) at 400 nm lower than 1%/mm, or lower than 0.75%/mm, or lower than 0.5%/mm, or lower than 0.25%/mm, or lower than 0.1%/mm. In another aspect, the ultraviolet absorbing glasses disclosed herein can achieve at least this transmission value without the use of copper halide precipitation. In a still further aspect, the ultraviolet absorbing glasses disclosed herein do not include any elemental silver or silver salts in the batch composition. In another aspect, transmission values at 400 nm are lower than 0.09%, or 0.08%, or 0.07%, or 0.06%, or 0.05%, or 0.025%.

As used herein, "mechanical strength" refers to a property of a glass article, specifically a property of the article to resist breakage, cracking, shattering, deformation, etc., when exposed to outside physical forces. In one aspect, it is desirable for articles produced from the ultraviolet absorbing glasses disclosed herein to have high mechanical strength. In a further aspect, a chemical tempering process can be used to increase the mechanical strength of the articles disclosed herein.

"ROR" or "modulus of rupture strength" as used herein is one measure of mechanical strength. This property may also be referred to as "flexural strength," "bend strength," or "fracture strength." ROR is a property of a brittle material and refers to the material's ability to resist deformation when a load is applied.

"DOL" or "depth of compression" (also referred to as "depth of layer") is a mechanical and/or physical property of chemically strengthened glass. Most glasses will have some number of surface flaws. A glass with a high DOL is able to resist breakage due to having a thick, compressed outer layer that is deeper than the surface flaws. Glasses with higher DOL values are also more resistant to scratches, abrasions, and impacts.

In one aspect, chemical tempering of the ultraviolet absorbing glasses disclosed herein results in a mean modulus of ruptures strength (ROR) greater than or equal to 40,000 psi (about 275 MPa) and a mean depth of compression (DOL) greater than or equal to 2.5 mil (about 63 μm). In one aspect, the ROR is greater than or approximately equal to 45,000 psi; or 50,000 psi; or 55,000 psi; or 60,000 psi; or 65,000 psi; or 70,000 psi; or 75,000 psi, where any value can provide a lower and upper endpoint of a range. In another aspect, the DOL is greater than or approximately equal to 65 μm, or 70 μm, 75 μm, 80 μm, 85 μm, 90 μm, 95 μm, 100 μm, 105 μm, or 110 μm, where any value can provide a lower and upper endpoint of a range.

"Chemical tempering" or "chemtempering" of glass is a process whereby the glass is exposed to a post-production chemical process to impart added mechanical strength. Chemical tempering is a surface finishing process and may be carried out, for example, in a bath containing a potassium salt. In one aspect, during chemical tempering, surface sodium ions in the glass are replaced by potassium ions from the tempering bath. Chemical tempering can also be a two-step process where the glass is first ion-exchanged with a sodium salt to increase surface sodium concentration, then ion-exchanged in a bath containing a potassium salt. In one aspect, chemically tempered glass has little optical distortion and can, in some aspects, be cut after tempering. In one aspect, the present ultraviolet absorbing glasses are chemically tempered. Tempering puts the outer surfaces of a glass into compression and increases DOL values. Chemically-tempered glass is more likely to break into small granules or chunks when it does break, rather than splintering into shards, and is thus less likely to result in injury upon breakage.

In another aspect, the ultraviolet absorbing glasses disclosed herein have excellent resistance to impact breakage. In a further aspect, this resistance is achieved by a chemical tempering process. In one aspect, chemical tempering consists of immersing the formed glasses in a molten salt bath. In this aspect, the formed glasses may be immersed for 1, 2, 3, 4, 5, 6, 7, 8, 9, 10, 11, 12, 13, 14, 15, 16, 17, 18, 19, 20, 21, 22, 23, or 24 hours, where any value can provide a lower and upper endpoint of a range. In a further aspect, the molten salt bath can contain $KNO_3$ and $NaNO_3$. In this aspect, the $KNO_3$ can be present at 10%, 20%, 30%, 40%, 50%, 60%, 70%, or 80% by weight of the molten salt bath and $NaNO_3$ can be present at 20%, 30%, 40%, 50%, 60%, 70%, 80%, or 90% by weight of the molten salt bath, where any value can provide a lower and upper endpoint of a range. In a still further aspect, the temperature of the molten salt bath is 350° C., 375° C., 400° C., 425° C., or 450° C. In one aspect, the formed glasses are immersed for 16 hours at 400° C. in a molten salt bath consisting of 60% by weight of $KNO_3$ and 40% by weight of $NaNO_3$.

In one aspect, the ultraviolet absorbing glass has a mean modulus of rupture strength greater (ROR) or equal to 40,000 psi (≈275 MPa) and mean depth-of-compression (DOL) greater than or equal to 2.5 mil (≈63 μm) after immersion in a molten salt bath.

In one aspect, maintaining a high ratio of lithium oxide over the sum of other alkali oxides (such as, for example, $Na_2O$ and $K_2O$) allows for simultaneously high ROR and DOL values. In one aspect, this ratio is greater than or equal to 0.8, 0.9, 1, 1.1, 1.2, or 1.3. Without wishing to be bound by theory, a high lithium oxide content enhances potassium diffusion during ion exchange processes (such as, for example, chemical tempering).

In some aspects, coloring agents are added to the glasses disclosed herein, and in other aspects, the glasses are colorless. In one aspect, when coloring agents are added, the coloring agents add sufficient glare reduction to meet the requirements of class 3 sunglasses under the AS 1067:2003 standard. In another aspect, the glasses have good optical properties.

In a further aspect, the coloring agent comprises NiO, CoO, $Fe_2O_3$, $Cr_2O_3$, $MnO_2$, a rare earth metal oxide, or any combination thereof. In this aspect, the amount of NiO can be less than or equal to 2.5, 2.0, 1.5, 1.0, 0.5, 0.1, or 0.05 parts by weight per 100 parts by weight base composition; the amount of CoO can be less than or equal to 2.5, 2.0, 1.5, 1.0, 0.5, or 0.1 parts by weight per 100 parts by weight base composition; the amount of $Fe_2O_3$ can be less than or equal to 6.0, 5.0, 4.0, 3.0, 2.0, 1.5, 1.0, 0.5, or 0.1 parts by weight per 100 parts by weight base composition; the amount of $Cr_2O_3$ can be less than or equal to 2.0, 1.5, 1.0, 0.5, 0.1, or 0.05 parts by weight per 100 parts by weight base composition; the amount of $MnO_2$ can be less than or equal to 4.0, 3.0, 2.0, 1.5, 1.0, 0.5, or 0.1 parts by weight per 100 parts by weight base composition; and the amount of the rare earth metal oxide can be less than or equal to 6.0, 5.0, 4.0, 3.0, 2.0, 1.5, 1.0, 0.5, 0.1, or 0.05 parts by weight per 100 parts by weight base composition.

In some aspects, the ultraviolet absorbing glass compositions disclosed herein can be formed into an article. In one aspect, that article is an ophthalmic lens. In a further aspect, the ophthalmic lenses disclosed herein can be used in sunglasses. In yet another aspect, the ultraviolet absorbing glasses disclosed herein can have a thickness of less than or equal to about 1 mm, 1.1 mm, 1.2 mm, 1.3 mm, 1.4 mm, 1.5 mm, 1.6 mm, 1.7 mm, 1.8 mm, 1.9 mm, or 2.0 mm, where any value can provide a lower and upper endpoint of a range. In one aspect, the ultraviolet absorbing glass is a sunglass lens and has a thickness of 1.4 mm. In one aspect, the ultraviolet absorbing glass can be laminated or coated with a protective layer. In a further aspect, the ultraviolet absorbing glass can achieve the desired thickness and maintain good mechanical strength without the inclusion of any laminating or protective layers.

Examples

The following examples are put forth so as to provide those of ordinary skill in the art with a complete disclosure and description of how the compositions and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.

Glass Composition Ranges

The present glasses can be prepared using conventional melting techniques and can be molded into any desired shape using conventional glass forming techniques. Following formation, the ultraviolet absorbing glasses are heat-treated at a temperature between 550° C. and 650° C. for a period ranging from 5 minutes to 2 hours to induce copper precipitation, which improves absorption of UV light.

Exemplary ranges for the various components of the present ultraviolet absorbing glasses are provided below. Particular components and amounts were determined based on practical glass-making considerations as well as their effects on physical, mechanical, and/or optical properties of the resulting glasses. The amounts of base glass components are provided in Table 1, where the sum of the components equals 100%.

TABLE 1

| Base Glass Composition | |
|---|---|
| Oxide | Weight % |
| $SiO_2$ | 50-60 |
| $Al_2O_3$ | 17.5-22 |
| $B_2O_3$ | 6.5-8 |
| $ZrO_2$ | 3.5-5.5 |
| $Li_2O$ | 0.5-7.5 |
| $Na_2O$ | 0.5-7.5 |
| $K_2O$ | 2-7 |
| $TiO_2$ | 0-2 |

Further to the ranges given in Table 1, when the base glass composition is expressed in cationic %, $Li_2O/(Na_2O+K_2O) \geq 1.0$.

The ultraviolet absorbing component used in the glass compositions in the examples are provided in Table 2.

TABLE 2

| Components Generating UV Absorption | |
|---|---|
| Oxide | Weight % |
| CuO | 0.25-1.5 |
| Cl | 0-3 |
| Br | 0-3 |
| Cl + Br | 0.2-4 |
| SnO | 0-4 |
| $Sb_2O_3$ | 0-4 |

For tinted glass compositions, the components provided in Table 3 and amounts thereof can be used.

TABLE 3

| Coloring Agents | |
|---|---|
| Oxide | Weight % |
| NiO | 0-2.5 |
| CoO | 0-2.5 |
| $Fe_2O_3$ | 0-6 |
| $Cr_2O_3$ | 0-2 |
| $MnO_2$ | 0-4 |
| Others, including $Er_2O_3$, $Pr_2O_3$, and related oxides | 0-5 |

Impact of Thickness Reduction on Commercial Glass

Tests were performed on a commercially available glass (CORNING® 82515, also known as GX15) to demonstrate that a reduction in thickness of any glass leads to an increase in transmission T at 400 nm, an increase in transmission in the visible range (seen in change in Tv (IIItC 2°) drift in color (seen in change in chromatic coordinates x and y), and a loss of UV absorption. Results are presented in Table 4.

TABLE 4

| Impact of Reduction in Thickness on Glass Properties | | | | |
|---|---|---|---|---|
| | 1 | 2 | 3 | 4 |
| Center thickness (mm) | 1.5 | 1.8 | 1.9 | 2 |
| Tv (IIItC 2°) | 19.2 | 13.4 | 12.1 | 11.0 |
| x | 0.3162 | 0.3161 | 0.3167 | 0.3181 |
| y | 0.3483 | 0.3540 | 0.3563 | 0.3595 |
| Class (AS 1067:2003) | 2 | 3 | 3 | 3 |
| T (400 nm) in % | 8.4 | 4.8 | 4.1 | 3.5 |

Compositions and Optical Properties of Example Glasses

Various glasses were constructed having concentrations of components as described in Tables 1-3 and their optical properties were tested. Results are presented in Table 5. Typical values for a commercial gray sunglass material (GX15) appear in column 5. For most glasses, base composition was held constant and UV-absorbing elements and/or coloring agents were varied. Variations of coloring agents resulting in a gray glass are illustrated in columns 6-9 of Table 5.

TABLE 5

Compositions and Optical Properties of Various Glasses

| | 5 | 6 | 7 | 8 | 9 | 10 | 11 | 12 |
|---|---|---|---|---|---|---|---|---|
| Oxide (Weight % Batched) | | | | | | | | |
| $SiO_2$ | | 53.7 | 53.1 | 53.0 | 54.0 | 52.4 | 51.6 | 52.3 |
| $B_2O_3$ | | 19.3 | 19.0 | 19.0 | 19.4 | 18.8 | 18.5 | 18.7 |
| $Al_2O_3$ | | 7.0 | 6.9 | 6.9 | 7.0 | 6.9 | 6.7 | 6.8 |
| $ZrO_2$ | | 4.3 | 4.3 | 4.3 | 4.4 | 4.2 | 4.2 | 4.2 |
| $Li_2O$ | | 4.0 | 4.0 | 4.0 | 4.1 | 3.9 | 3.9 | 3.9 |
| $Na_2O$ | | 0.8 | 0.8 | 0.8 | 4.0 | 0.8 | 0.7 | 0.7 |
| $K_2O$ | | 6.1 | 6.0 | 6.0 | 0.9 | 5.9 | 5.8 | 5.9 |
| $TiO_2$ | | 1.1 | 1.0 | 1.0 | 1.1 | 1.0 | 1.0 | 1.0 |
| UV Absorbing and Coloring Agents | | | | | | | | |
| CuO | | 0.77 | 0.77 | 0.77 | 0.77 | 0.77 | 0.77 | 0.77 |
| Br | | 2.33 | 2.33 | 2.33 | 2.33 | 2.33 | 2.33 | 2.33 |
| NiO | | 0 | 0 | 0 | 0 | 0 | 0 | 0.045 |
| CoO | | 0.118 | 0.235 | 0.27 | 0.27 | 0 | 0 | 0.085 |
| $Fe_2O_3$ | | 0.3 | 1.5 | 1.65 | 1.65 | 2.5 | 2.5 | 2.5 |
| $Cr_2O_3$ | | 0.18 | 0.017 | 0.025 | 0.025 | 0 | 0 | 0.045 |
| $MnO_2$ | | 0 | 0 | 0 | 0 | 0.5 | 2 | 0.5 |
| Oxide (Cationic % Batched) | | | | | | | | |
| $Li_2O$ | | 13.1 | 13.1 | 13.1 | 13.1 | 13.1 | 13.1 | 13.1 |
| $Na_2O$ | | 1.1 | 1.1 | 1.1 | 6.3 | 1.1 | 1.1 | 1.1 |
| $K_2O$ | | 6.2 | 6.2 | 6.2 | 1.0 | 6.2 | 6.2 | 6.2 |
| $Na_2O + K_2O$ | | 7.3 | 7.3 | 7.3 | 7.3 | 7.3 | 7.3 | 7.3 |
| $Li_2O/(Na_2O + K_2O)$ | | 1.79 | 1.79 | 1.79 | 1.79 | 1.79 | 1.79 | 1.79 |
| Optical Properties | | | | | | | | |
| Ctr. Thickness (mm) | 2 | 1.4 | 1.4 | 1.4 | 1.4 | 1.4 | 1.4 | 1.4 |
| Tv (IIItC 2°) | 14.0 | 35.7 | 19.9 | 15.7 | 17.7 | 27.2 | 21.5 | 24.6 |
| x | 0.3180 | 0.2759 | 0.3137 | 0.3161 | 0.3151 | 0.4650 | 0.5290 | 0.4618 |
| y | 0.3550 | 0.3292 | 0.3445 | 0.3511 | 0.3500 | 0.4535 | 0.4515 | 0.4536 |
| Class (AS 1067:2003) | 3 | 2 | 2 | 3 | 3 | 2 | 2 | 2 |
| T (400 nm) in % | | 0 | 0 | 0 | 0 | 0 | 0 | 0 |

Glass 8 demonstrates optical properties at a 1.4 mm center thickness resembling those of a thicker (2 mm) commercial product (GX15) (see Tv (IIItC 2°) values), though with an improved UV absorption (see T (400 nm) values). As seen with glass 9, alkali balance can be changed without a loss in optical performance of the ultraviolet absorbing glass. However, $Li_2O/(Na_2O+K_2O)$, expressed in cationic percent, should be maintained at greater than or equal to 1 for mechanical reasons. Glasses 10-12 represent brown glasses that can be obtained from the present formulations based on changes in coloring agents. Other coloring agents are also contemplated.

Mechanical Properties of Various Glasses

Lenses were prepared from two ultraviolet absorbing glasses as described above (columns 8 and 9) and were compared to a colorless UV absorbing commercially available glass (CORNING® UV Clear 8010, column 13). These properties are provided in Table 6.

TABLE 6

Mechanical Properties of Various Glasses

| | Glass Code | | |
|---|---|---|---|
| | 13 (UV Clear 8010) | 8 | 9 |
| Oxide (Weight % Batched) | | | |
| $SiO_2$ | 48.5 | 53.0 | 54.0 |
| $B_2O_3$ | 20.3 | 19.0 | 19.4 |
| $Al_2O_3$ | 8.6 | 6.9 | 7.0 |
| $ZrO_2$ | 3.5 | 4.3 | 4.4 |
| $Li_2O$ | 2.1 | 4.0 | 4.1 |
| $Na_2O$ | 3.4 | 0.8 | 4.0 |
| $K_2O$ | 5.6 | 6.0 | 0.9 |
| BaO | 4.7 | 0 | 0 |
| $TiO_2$ | 0 | 1.0 | 1.1 |
| CuO | 0.77 | 0.77 | 0.77 |
| Br | 2.33 | 2.33 | 2.33 |
| CoO | 0 | 0.27 | 0.27 |
| Fe2O3 | 0 | 1.65 | 1.65 |
| Cr2O3 | 0 | 0.025 | 0.025 |
| Oxide (Cationic % Batched) | | | |
| $Li_2O$ | 7.0 | 13.1 | 13.1 |
| $Na_2O$ | 5.5 | 1.1 | 6.3 |
| $K_2O$ | 6.0 | 6.2 | 1.0 |
| $Na_2O + K_2O$ | 11.5 | 7.3 | 7.3 |
| $Li_2O/(Na_2O + K_2O)$ | 0.61 | 1.79 | 1.79 |
| Mechanical Properties | | | |
| Average ROR (MPa) | 309 | 393 | 524 |
| Standard Deviation | 61 | 72 | 73 |
| ROR (Psi) | 44800 | 57000 | 76000 |
| DOL (μm) | 61 | 70 | 105 |
| DOL (mil) | 2.4 | 2.8 | 4.1 |

Compared to the commercially available product, lithium oxide was maintained at a higher level in the present ultraviolet absorbing glasses to enhance potassium diffusion during ion exchange processes. This leads to better mechanical resistance (see average ROR value) when samples are tested after chemical tempering. These higher ROR values are, in the present instance, compatible with thinner lenses. To balance these properties, a high ratio of lithium oxide to the sum of all other alkali metal oxides is required. In this case, $Li_2O/(Na_2O+K_2O)$, expressed in cationic percent, was greater than or equal to 1.0.

Throughout this application, various publications are referenced. The disclosures of these publications in their entireties are hereby incorporated by reference into this application in order to more fully describe the compounds, compositions, and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. An ultraviolet absorbing glass comprising (a) a base glass composition comprising in weight percent:

| | |
|---|---|
| $SiO_2$ | 50-60 |
| $B_2O_3$ | 17.5-22.0 |
| $Al_2O_3$ | 6.5-8.0 |
| $Li_2O$ | 3.5-5.5 |
| $Na_2O$ | 0.5-7.5 |
| $K_2O$ | 0.5-7.5 |
| $ZrO_2$ | 2.0-7.0 |
| $TiO_2$ | 0-2.0 | and (b) an ultraviolet component comprising (i) copper oxide and (ii) a chloride source, a bromide source, or a combination thereof, wherein the amount of copper oxide is from 0.25 to 1.5 parts by weight per 100 parts by weight base composition; and the sum of the chloride derived from the chloride source, the bromide derived from the bromide source, or a combination thereof is from 0.2 to 4.0 parts by weight per 100 parts by weight base composition.

2. The glass of claim 1, wherein the base glass composition comprises in weight percent:

| | |
|---|---|
| $SiO_2$ | 54.0-58.0 |
| $B_2O_3$ | 19.0-21.0 |
| $Al_2O_3$ | 7.0-8.0 |
| $Li_2O$ | 4.0-5.0 |
| $Na_2O$ | 0.5-1.0 |
| $K_2O$ | 6.0-7.0 |
| $ZrO_2$ | 4.0-5.0 |
| $TiO_2$ | 0.5-1.5. |

3. The glass of claim 1, wherein the base glass composition comprises in weight percent:

| | |
|---|---|
| $SiO_2$ | 55.0-57.0 |
| $B_2O_3$ | 20.0-21.0 |
| $Al_2O_3$ | 7.0-8.0 |
| $Li_2O$ | 4.0-5.0 |
| $Na_2O$ | 4.0-5.0 |
| $K_2O$ | 0.5-1.5 |
| $ZrO_2$ | 4.0-5.0 |
| $TiO_2$ | 0.5-1.5. |

4. The glass of claim 1, wherein the molar ratio of $Li_2O$ to $(Na_2O+K_2O)$, expressed in cationic percent, is greater than or equal to 1.

5. The glass of claim 1, wherein the amount of copper oxide is from 0.5 to 1.0 parts by weight per 100 parts by weight base composition and the bromide derived from the bromide source is from 2.0 to 4.0 parts by weight per 100 parts by weight base composition.

6. The glass of claim 1, wherein the chloride source is NaCl or KCl and the bromide source is NaBr or KBr.

7. The glass of claim 1, wherein the ultraviolet absorbing glass further comprises one or more coloring agents.

8. The glass of claim 7, wherein the coloring agent comprises NiO, CoO, $Fe_2O_3$, $Cr_2O_3$, $MnO_2$, a rare earth metal oxide, or any combination thereof.

9. The glass of claim 8, wherein
the amount of NiO is less than or equal to 2.5 parts by weight per 100 parts by weight base composition;
the amount of CoO is less than or equal to 2.5 parts by weight per 100 parts by weight base composition;
the amount of $Fe_2O_3$ is less than or equal to 6.0 parts by weight per 100 parts by weight base composition;
the amount of $Cr_2O_3$ is less than or equal to 2.0 parts by weight per 100 parts by weight base composition;
the amount of $MnO_2$ is less than or equal to 4.0 parts by weight per 100 parts by weight base composition; and
the amount of the rare earth metal oxide is less than or equal to 6.0 parts by weight per 100 parts by weight base composition.

10. The glass of claim 1, wherein the ultraviolet absorbing glass is prepared from a batch composition that does not include elemental silver, a silver salt, or a combination thereof.

11. The glass of claim 1, wherein the ultraviolet absorbing glass has a transmission of less than or equal to 1%/mm at 400 nm.

12. The glass of claim 1, wherein the ultraviolet absorbing glass has a mean modulus of rupture strength greater or equal to 40,000 psi (≈275 MPa) and mean depth-of-compression (DOL) greater than or equal to 2.5 mil (≈63 μm) after immersion in a molten salt bath consisting of 60 wt % of $KNO_3$ and 40 wt % of $NaNO_3$ for 16 hours at 400° C.

13. A glass article comprising the ultraviolet absorbing glass of claim 1.

14. The article of claim 13, wherein the article comprises an ophthalmic lens.

15. The article of claim 14, wherein the ophthalmic lens is a lens for sunglasses.

16. The article of claim 14, wherein the lens has a thickness of 1 mm to less than 2 mm.

17. The article of claim 14, wherein the lens has a thickness of 1.2 mm to 1.6 mm.

* * * * *

UNITED STATES PATENT AND TRADEMARK OFFICE
CERTIFICATE OF CORRECTION

PATENT NO. : 9,938,182 B2  
APPLICATION NO. : 15/043711  
DATED : April 10, 2018  
INVENTOR(S) : Yves Andre Henri Brocheton Page 1 of 1

It is certified that error appears in the above-identified patent and that said Letters Patent is hereby corrected as shown below:

On the Title Page

In Column 2, item (56), Other Publications, Line 1, delete "Search Search" and insert -- Search --, therefor.

Signed and Sealed this  
Ninth Day of June, 2020

Andrei Iancu  
*Director of the United States Patent and Trademark Office*